United States Patent
Hong

(10) Patent No.: US 11,914,032 B2
(45) Date of Patent: Feb. 27, 2024

(54) RADAR SUPPORT DEVICE

(71) Applicants: Hyundai Motor Company, Seoul (KR); Kia Corporation, Seoul (KR)

(72) Inventor: Jeung Sik Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 17/474,343

(22) Filed: Sep. 14, 2021

(65) Prior Publication Data

US 2022/0196831 A1    Jun. 23, 2022

(30) Foreign Application Priority Data

Dec. 22, 2020    (KR) ........................ 10-2020-0181113

(51) Int. Cl.
*B60R 11/00*    (2006.01)
*G01S 13/931*    (2020.01)

(52) U.S. Cl.
CPC ............ *G01S 13/931* (2013.01); *B60R 11/00* (2013.01); *B60R 2011/004* (2013.01); *B60R 2011/0052* (2013.01); *B60R 2011/0084* (2013.01); *G01S 2013/93271* (2020.01); *G01S 2013/93275* (2020.01)

(58) Field of Classification Search
None
See application file for complete search history.

(56) References Cited

U.S. PATENT DOCUMENTS

| | | | |
|---|---|---|---|
| 9,956,993 B1* | 5/2018 | Klop | B60R 19/483 |
| 2014/0299644 A1* | 10/2014 | Aleem | B60R 21/00 |
| | | | 224/555 |
| 2019/0198986 A1* | 6/2019 | Singh | H01Q 1/3283 |
| 2019/0219689 A1* | 7/2019 | Fujita | B60R 19/483 |
| 2020/0110155 A1* | 4/2020 | Cho | G01S 7/027 |
| 2021/0057808 A1* | 2/2021 | Kim | H01Q 1/3291 |
| 2023/0202404 A1* | 6/2023 | Nakayama | B60R 11/00 |
| | | | 296/1.08 |
| 2023/0204712 A1* | 6/2023 | Inoue | G01S 7/027 |
| | | | 342/27 |
| 2023/0213143 A1* | 7/2023 | Kim | F16M 13/02 |
| | | | 248/220.22 |

* cited by examiner

*Primary Examiner* — Steven M Marsh
(74) *Attorney, Agent, or Firm* — Fox Rothschild LLP

(57) ABSTRACT

A radar support device supports a radar that detects an object in front of a vehicle. The radar support device includes a bracket that is mounted to the vehicle and a plurality of guide rods that extend rearward from the radar while fixed to the radar and coupled to the bracket in forward and rearward directions. A plurality of fastening members are fastened to the plurality of guide rods from a rear surface of the bracket, and one or more springs are installed between the radar and the bracket to move the radar forward.

7 Claims, 5 Drawing Sheets

RADAR SUPPORT DEVICE

CROSS-REFERENCE TO RELATED APPLICATION(S)

This application is based on and claims priority under 35 U.S.C. § 119 to Korean Patent Application No. 10-2020-0181113, filed on Dec. 22, 2020, in the Korean Intellectual Property Office, the disclosure of which is incorporated by reference herein in its entirety.

BACKGROUND

1. Field of the Disclosure

The disclosure relates to a radar support device for supporting a radar of a vehicle.

2. Description of the Related Art

Recently developed vehicles are equipped with a radar that detects the position of and distance to a preceding vehicle or an obstacle to ensure driving stability of a driver. The radar is an essential element for the implementation of an advanced driver assistance system (ADAS) such as a vehicle collision warning system, an automatic emergency brake (AEB) system, a smart cruise control system (SCC) and a lane departure warning system (LDWS). The radar is typically mounted on a bumper or the inside of a grill of the front side of a vehicle, and transmits and receives radar signals through a radar cover provided on the bumper or grill.

A radar signal is transmitted by spreading frontward from the radar. Therefore, the radar cover installed in front of the radar is greater than a signal transmission part of the radar to prevent interference with the spread radar signal. In addition, the radar is required to maintain operation even in the event of a frontal collision of the vehicle. Therefore, a conventional radar is mounted at a position spaced 30 mm or more backward from the radar cover. However, in this case, the radar cover needs to be larger to prevent interference with radar signals. However, since the radar cover is exposed on the front of a vehicle, the excessive size of the radar cover may lead to deterioration of an exterior design of the vehicle.

SUMMARY

It is an aspect of the disclosure to provide a radar support device capable of maintaining the operation of a radar in a collision situation while minimizing a size of a radar cover by reducing a distance between the radar and the radar cover.

Additional aspects of the disclosure will be set forth in part in the description which follows and, in part, will be obvious from the description, or may be learned by practice of the disclosure.

In accordance with an aspect of the disclosure, a radar support device for supporting a radar detecting an object in front of a vehicle may include a bracket mounted to the vehicle, a plurality of guide rods extending rearward from the radar while fixed to the radar and coupled to the bracket in forward and rearward directions, a plurality of fastening members fastened to the plurality of guide rods from a rear surface of the bracket, and one or more springs installed between the radar and the bracket to move the radar forward.

The spring may include a leaf spring having opposite sides that support a rear surface of the radar and a front surface of the bracket. The leaf spring may include an upper leaf spring and a lower leaf spring spaced apart from each other in a vertical direction. The leaf spring may include a fixing part fixed to the rear surface of the radar, and first and second elastic deformation part respectively extending from opposite ends of the fixing part toward the front surface of the bracket, maintaining an inclination with respect to the front surface of the bracket and slidably supported on the front surface of the bracket. The spring may include a plurality of coil springs installed on outer surfaces of the plurality of guide rods, respectively.

The radar support device may further include a plurality of guide sleeves fixed to the bracket to slidably support outer surfaces of the plurality of guide rods. Each of the plurality of fastening members may be screwed to an outer surface of each of the plurality of guide rods to adjust a distance between the bracket and the radar by being tightened or loosened. The plurality of guide rods may guide the rearward movement of the radar when a vehicle collision occurs, and the one or more springs may move the radar forward after the vehicle collision to approach a radar cover positioned in front of the radar.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
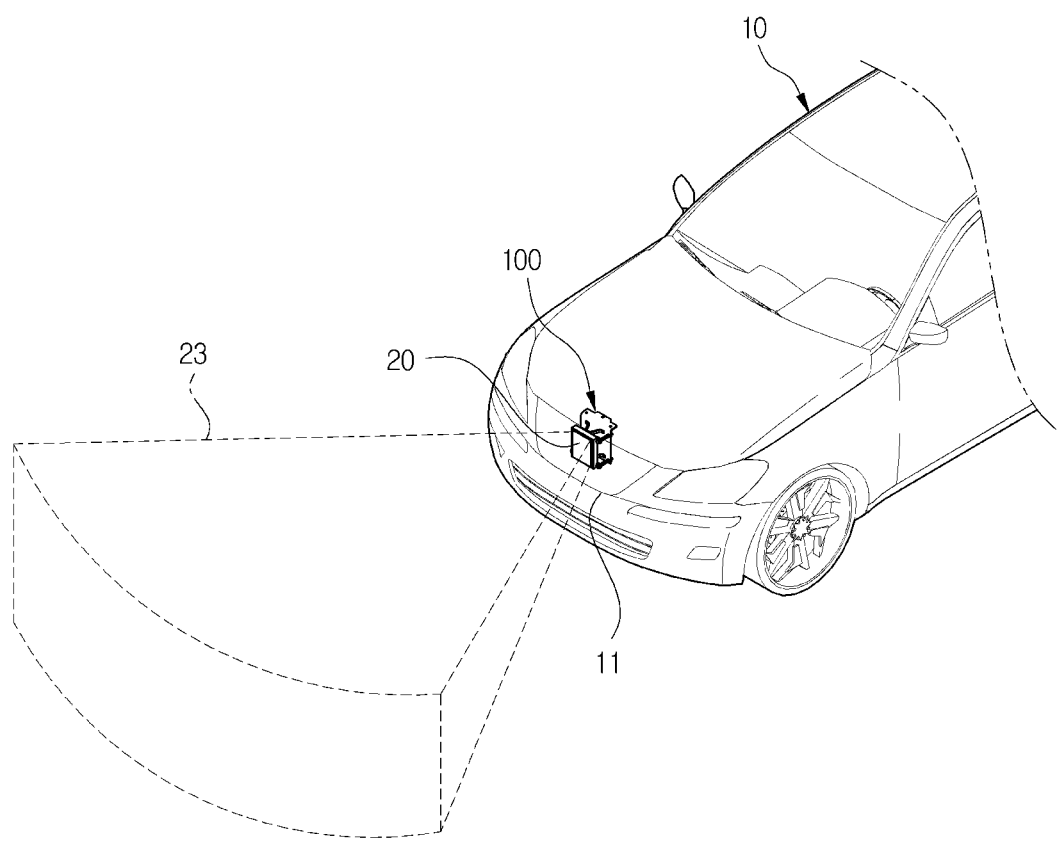
FIG. 1 is a perspective view of a vehicle to which a radar support device according to an embodiment of the disclosure is applied.
Figure 2:
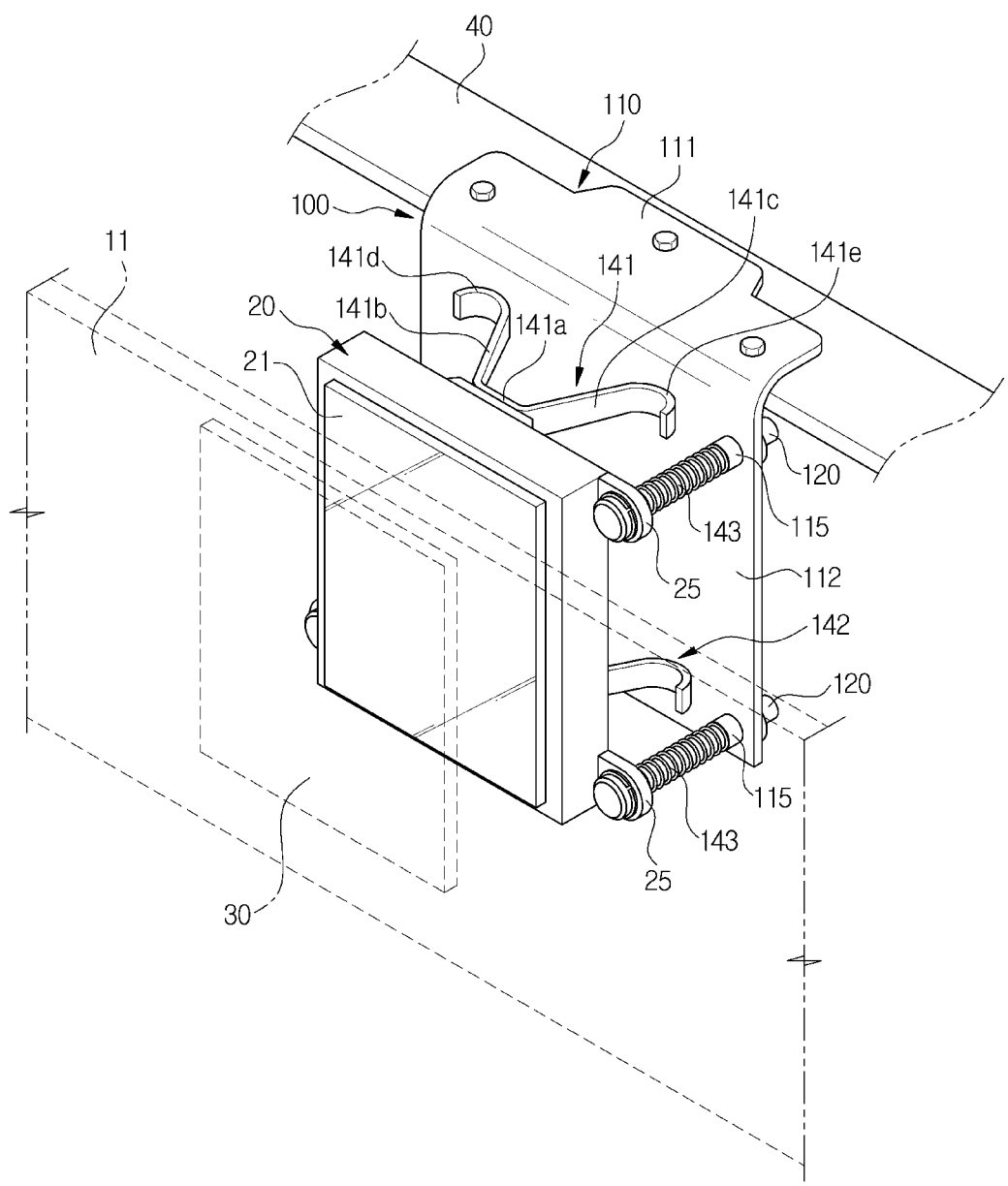
FIG. 2 is a perspective view of the radar support device according to an embodiment of the disclosure.

Referring to FIGS. 1 and 2, a radar 20 for detecting a preceding vehicle, an obstacle, etc. is installed on a front part 11 of a vehicle 10. The radar 20 may be mounted inside a bumper or a grill of the front part 11 of the vehicle 10 and may be configured to transmit and receive a radar signal 23 through a radar cover 30 installed on the bumper or the grill. The radar signal 23 may be transmitted in a manner of spreading frontward from the radar 20.

Referring to FIG. 2, a radar support device 100 according to the present embodiment may support the radar 20 in a state installed in a rear space of the grill or bumper of the front part 11 of the vehicle 10. The radar 20 supported on the radar support device 100 may be disposed such that a signal transmission part 21 is proximate to a rear surface of the radar cover 30.

Figure 3:
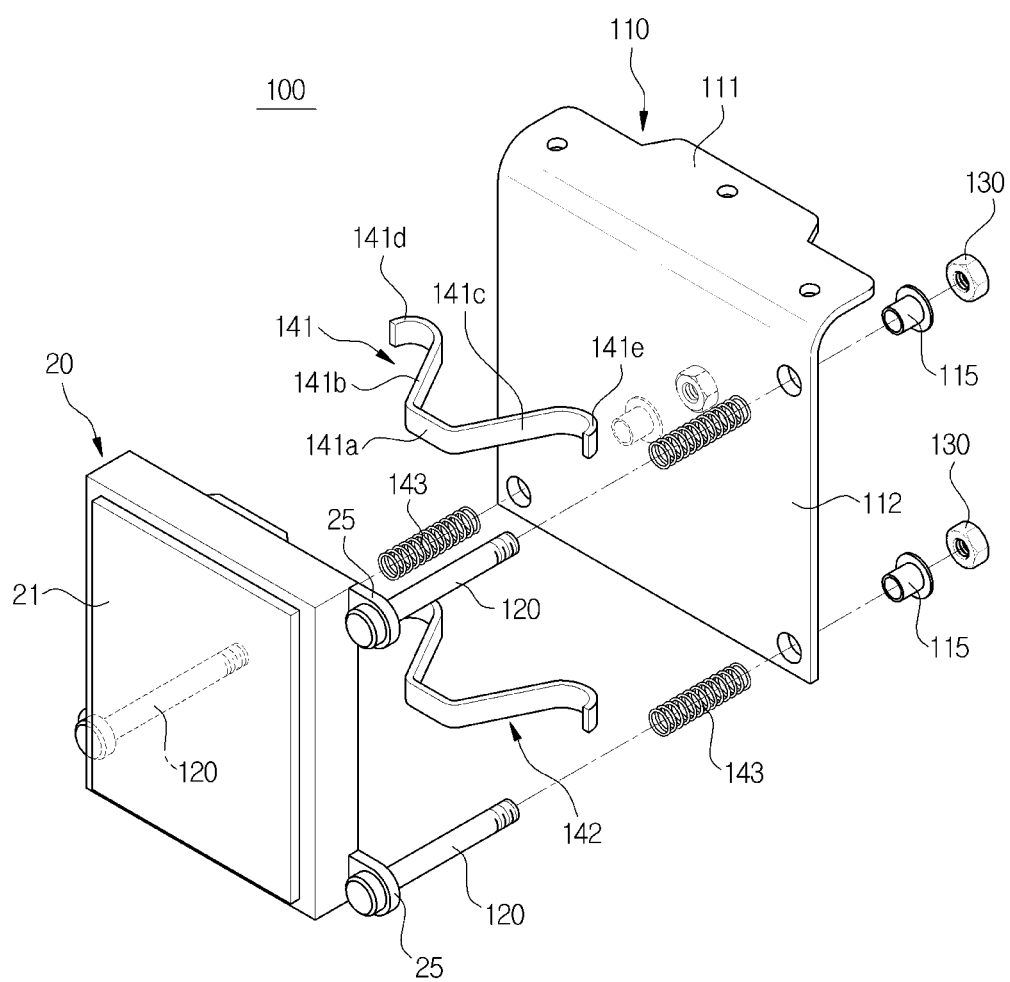
FIG. 3 is an exploded perspective view of the radar support device according to an embodiment of the disclosure.

As illustrated in FIGS. 2 and 3, the radar support device 100 may include a bracket 110, a plurality of guide rods 120, a plurality of fastening members 130, and restoration springs. The bracket 110 is fixed to a structure 40 provided in the rear space of the grill or bumper of the vehicle 10. The bracket 110 may include a fixing part 111 fixed to the structure 40 inside the vehicle 10 through fastening of a fixing screw, etc., and a support part 112 in the form of a flat plate extending downward from a front end of the fixing part 111. A front surface of the support part 112 may be disposed parallel to a rear surface of the radar 120.

The plurality of guide rods 120 have first ends thereof fixed to fixing parts 25 provided at opposite side ends of the radar 20, respectively. In addition, two of the fixed parts 25 may be disposed at upper and lower portions of a first side end thereof in a state of being spaced apart from each other and one of the fixed part 25 may be disposed at a lower portion of a second side end thereof. These fixing parts 25 may be provided integrally with a housing of the radar 20 in a process of molding the housing of the radar 20. In addition, first ends of the guide rods 120 may be fixed to the fixing parts 25 by an insert injection method in a process of molding the fixing parts 25, respectively.

The plurality of guide rods 120 extend rearward while parallel to each other from the fixing parts 25 of the radar 20, respectively. The plurality of guide rods 120 may be slidably coupled to the support part 112 of the bracket 110 in a form of penetrating the support part 112 of the bracket 110. Accordingly, the radar 20 may move forward and backward together with the plurality of guide rods 120 while fixed to the plurality of guide rods 120.

A plurality of guide sleeves 115 for slidably supporting outer surfaces of the plurality of guide rods 120 may be installed on the support part 112 of the bracket 110 through which the plurality of guide rods 120 penetrates. The plurality of guide sleeves 115 may be fixed in a manner that each of the sleeves 115 is press-fitted to the support part 112 of the bracket 110. Therefore, the plurality of guide rods 120 may move more stably forward or backward while supported in parallel to each other and may more stably guide the forward or backward movement of the radar 20.

The plurality of fastening members 130 may be respectively fastened to the outer surfaces of the plurality of guide rods 120 from a rear surface of the support part 112 of the bracket 110. Each of the plurality of fastening members 130 may be mounted to a rear end of each of the guide rods 120 in a screw-coupled manner. Therefore, when the radar 20 is installed, a distance L1 between the front surface of the support part 112 of the bracket 110 and the rear surface of the radar 20 may be adjusted by tightening or loosening the plurality of fastening members 130.

The restoration springs may include an upper leaf spring 141, a lower leaf spring 142, and a plurality of coil springs 143. These restoration springs may move the radar 20 by pressing the radar 20 forward in a state of being installed between the radar 20 and the bracket 110. The upper leaf spring 141 and the lower leaf spring 142 may be installed to support the rear surface of the radar 20 and the front surface of the support part 112 of the bracket 110 while vertically spaced apart from each other. The upper leaf spring 141 may include a fixing part 141a fixed to the rear surface of the radar 20, and first and second elastic deformation parts 141b and 141c extending from the fixing part 141a toward a front surface of the bracket 110.

The fixing part 141a may be fixed to the rear surface of the radar 20 by spot welding or fastening with a fixing screw. The first and second elastic deformation parts 141b and 141c may be provided in a form of extending to opposite sides from opposite ends of the fixing part 141a, respectively, and may maintain an inclination with respect to the front surface of the support part 112 of the bracket 110. The first and second elastic deformation parts 141b and 141c may include sliding support portions 141d and 141e bent in a curved shape at rear ends thereof to enable sliding in a state of being supported on the front surface of the support part 112 of the bracket 110.

Figure 4:
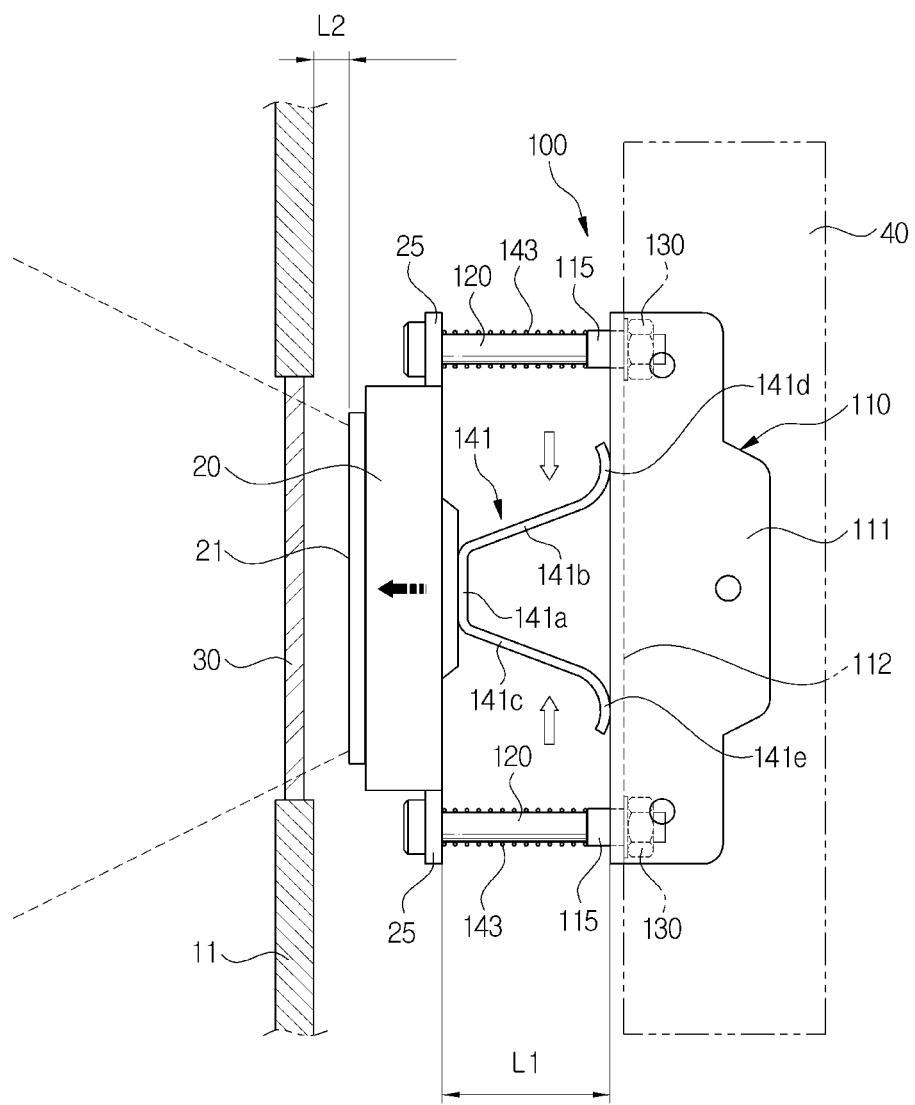
FIG. 4 is a plan view of the radar support device according to an embodiment of the disclosure, illustrating a state in which a radar is normally moved in the front.
Figure 5:
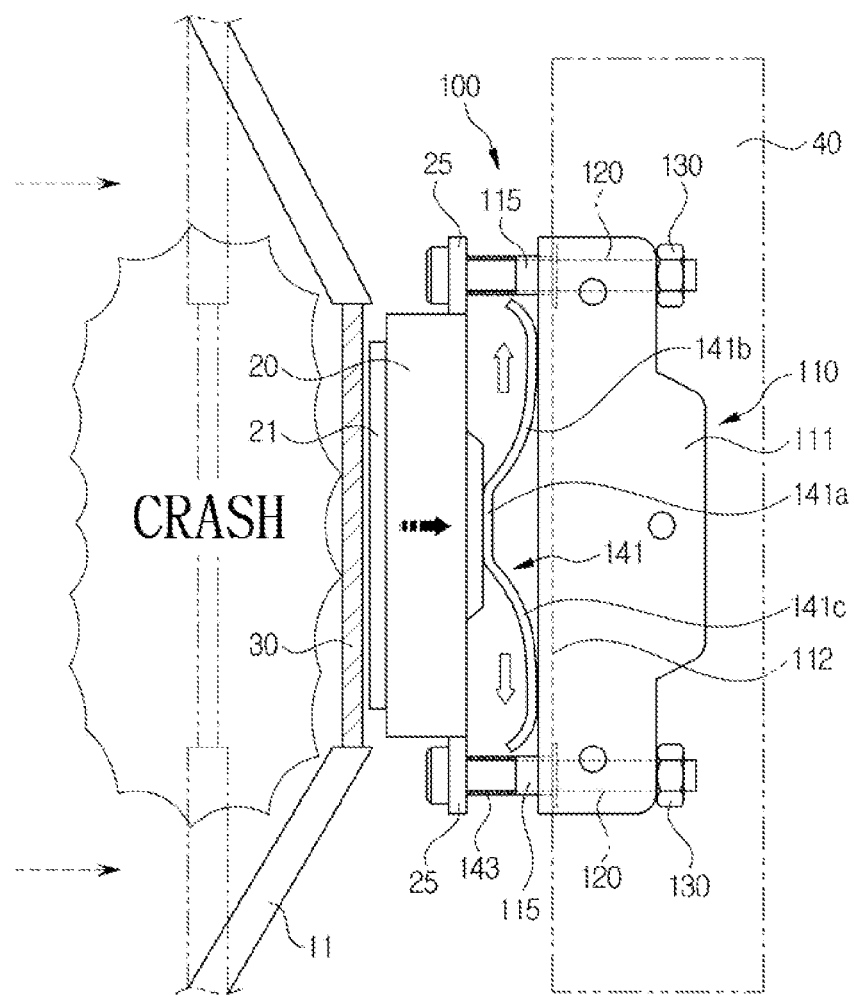
FIG. 5 is a plan view of the radar support device according to an embodiment of the disclosure, illustrating a state in which the radar is moved in the rear due to a front collision of a vehicle.

The lower leaf spring 142 may be configured the same as the upper leaf spring 141 except for a different installation position. The upper and lower leaf springs 141 and 142 as described above may maintain a state in which the radar 20 is moved forward by pressing the rear surface of the radar 20 forward as illustrated in FIG. 4, and may prevent the radar 20 from being damaged by an impact by allowing the radar 20 to be pushed backward when a vehicle collision occurs as illustrated in FIG. 5. The plurality of coil springs 143 may be respectively installed on the outer surfaces of the plurality of guide rods 120 between the radar 20 and the bracket 110. The plurality of coil springs 143 also presses and moves the radar 20 toward the front and elastically supports the fixing parts 25 of the radar 20 to allow the radar 20 to move forward and backward more stably.

The radar support device 100 of the present embodiment exemplifies a case in which the upper and lower leaf springs 141 and 142 and the plurality of coil springs 143 are applied together to implement the forward movement of the radar 20. However, the radar support device 100 may exclude the plurality of coil springs 143 and include only the upper leaf spring 141 and the lower leaf spring 142, or may include only the plurality of coil spring 143 instead of the plurality of upper and lower leaf springs 141 and 142. Additionally, the radar support device 100 may be configured to include only one leaf spring having a relatively large elastic restoring force in a central portion between the radar 20 and the support part 112 of the bracket 110.

In the radar support device 100 of the present embodiment, since the radar 20 may be moved in forward and backward directions, as illustrated in FIG. 4, the signal transmission part 21 of the radar 20 may be positioned to be proximate to the rear surface of the radar cover 30. In other words, a distance L2 between a front surface of the signal transmission part 21 of the radar 20 and the rear surface of the radar cover 30 may be set much shorter than about 30 mm as provided in a conventional device.

Therefore, when the radar support device 100 according to the present embodiment is used, a size of the radar cover 30 exposed to the outside of the front part 11 of the vehicle 10 may be reduced by a length that the distance L2 between the radar 20 and the radar cover 30 is reduced compared to the conventional one, so that an exterior design of the front part 11 of the vehicle 10 may be improved.

Further, since the radar support device 100 of the present embodiment may adopt the reduced size radar cover 30 with a relatively low probability of damage, damage or malfunction of the radar 20 due to damage to the radar cover 30 when a vehicle collision occurs may be minimized. As illustrated in FIG. 5, in the radar support device 100 of the present embodiment, since the radar 20 may be moved backward while being guided by the plurality of guide rods 120 during a front collision accident of the vehicle 10, a phenomenon in which the radar 20 is damaged by impact may be minimized. In addition, in the radar support device 100 of the present embodiment, since the one or more restoration springs move the radar 20 forward quickly immediately after the vehicle collision so that the radar 20 approaches the radar cover 30, even in a collision situation, the radar 20 may maintain its function, and thus a secondary accident of the vehicle 10 may be prevented.

As is apparent from the above, in a radar support device according to an embodiment of the disclosure, since a radar may be installed to be proximate to a radar cover, a size of the radar cover may be reduced further compared to a conventional one, thus improving an exterior design of a front part of a vehicle. Further, since the radar support device according to an embodiment of the disclosure may adopt a reduced size radar cover with a relatively low probability of damage, damage or malfunction of the radar due to damage to the radar cover when a vehicle collision occurs may be minimized.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

What is claimed is:

1. A radar support device for supporting a radar detecting an object in front of a vehicle, the radar support device comprising:
    a bracket mounted to the vehicle;
    a plurality of guide rods extending rearward from the radar while fixed to the radar and coupled to the bracket in forward and rearward directions;
    a plurality of fastening members fastened to the plurality of guide rods from a rear surface of the bracket; and
    one or more springs installed between the radar and the bracket to move the radar forward;
    wherein the spring includes a leaf spring having opposite sides that support a rear surface of the radar and a front surface of the bracket.

2. The radar support device according to claim 1, wherein the leaf spring includes an upper leaf spring and a lower leaf spring spaced apart from each other in a vertical direction.

3. The radar support device according to claim 1, wherein the leaf spring includes:
    a fixing part fixed to the rear surface of the radar; and
    first and second elastic deformation part respectively extending from opposite ends of the fixing part toward the front surface of the bracket, maintaining an inclination with respect to the front surface of the bracket and slidably supported on the front surface of the bracket.

4. The radar support device according to claim 1, wherein the spring includes a plurality of coil springs installed on outer surfaces of the plurality of guide rods, respectively.

5. A radar support device for supporting a radar detecting an object in front of a vehicle, the radar support device comprising:
    a bracket mounted to the vehicle;
    a plurality of guide rods extending rearward from the radar while fixed to the radar and coupled to the bracket in forward and rearward directions;
    a plurality of fastening members fastened to the plurality of guide rods from a rear surface of the bracket;
    one or more springs installed between the radar and the bracket to move the radar forward; and
    a plurality of guide sleeves fixed to the bracket to slidably support outer surfaces of the plurality of guide rods.

6. A radar support device for supporting a radar detecting an object in front of a vehicle, the radar support device comprising:
    a bracket mounted to the vehicle;
    a plurality of guide rods extending rearward from the radar while fixed to the radar and coupled to the bracket in forward and rearward directions;
    a plurality of fastening members fastened to the plurality of guide rods from a rear surface of the bracket; and
    one or more springs installed between the radar and the bracket to move the radar forward;
    wherein each of the plurality of fastening members is screwed to an outer surface of each of the plurality of guide rods to adjust a distance between the bracket and the radar by being tightened or loosened.

7. The radar support device according to claim 1, wherein:
    the plurality of guide rods guides the rearward movement of the radar when a vehicle collision occurs, and
    the one or more springs move the radar forward after the vehicle collision to approach a radar cover positioned in front of the radar.

* * * * *